A. M. LEONI AND A. TISCHER.
UNIVERSAL JOINT AND BRAKE DRUM UNIT.
APPLICATION FILED FEB. 13, 1920.

1,415,371.   Patented May 9, 1922.

Inventor
Alfonso M. Leoni
Arthur Tischer

By  Attorney

UNITED STATES PATENT OFFICE.

ALFONSO M. LEONI AND ARTHUR TISCHER, OF PHILADELPHIA, PENNSYLVANIA, ASSIGNORS, BY MESNE ASSIGNMENTS, TO STEINMETZ ELECTRIC MOTOR CAR CORPORATION, OF BALTIMORE, MARYLAND, A CORPORATION OF MARYLAND.

UNIVERSAL JOINT AND BRAKE-DRUM UNIT.

1,415,371.      Specification of Letters Patent.      Patented May 9, 1922.

Application filed February 13, 1920. Serial No. 358,551.

*To all whom it may concern:*

Be it known that we, ALFONSO M. LEONI and ARTHUR TISCHER, citizens of the United States, residing at Philadelphia, in the county of Philadelphia and State of Pennsylvania, have invented certain new and useful Improvements in Universal Joint and Brake-Drum Units, of which the following is a specification.

This invention relates to a brake drum and universal joint unit as a part of an engine drive for motor vehicles, and consists generally in utilizing the driving flange of the universal joint coupling as a part of the brake drum.

The invention provides for effective control in that it permits a direct braking action on the driven shaft, while at the same time affording unusual ease of access to these particular parts when desired.

The invention in the preferred form contemplated is illustrated in the accompanying drawings, in which:—

Figure 1:
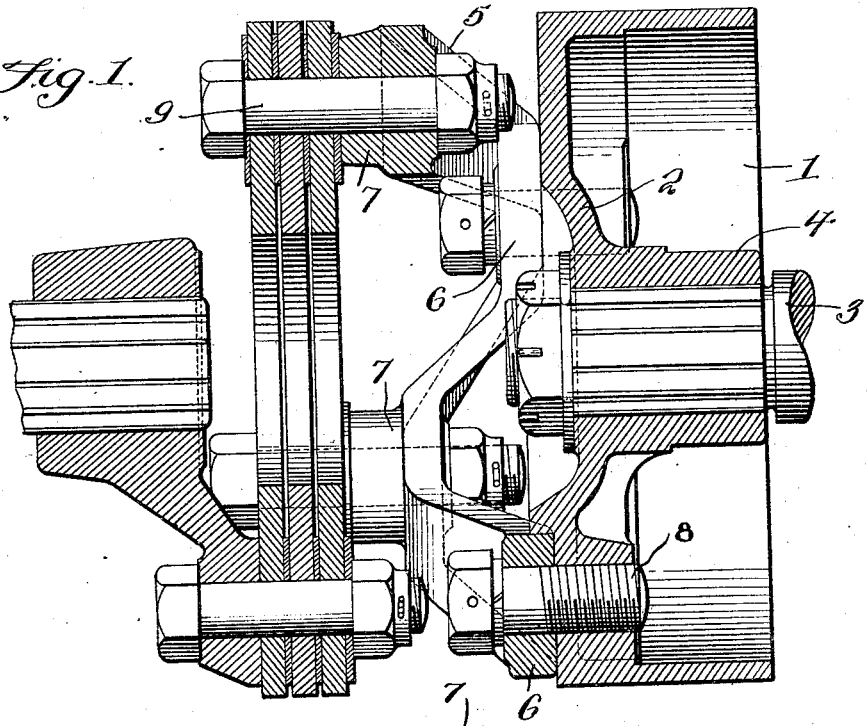
Fig. 1 is a view in elevation, partly in section, illustrating the improved unit.
Figure 2:
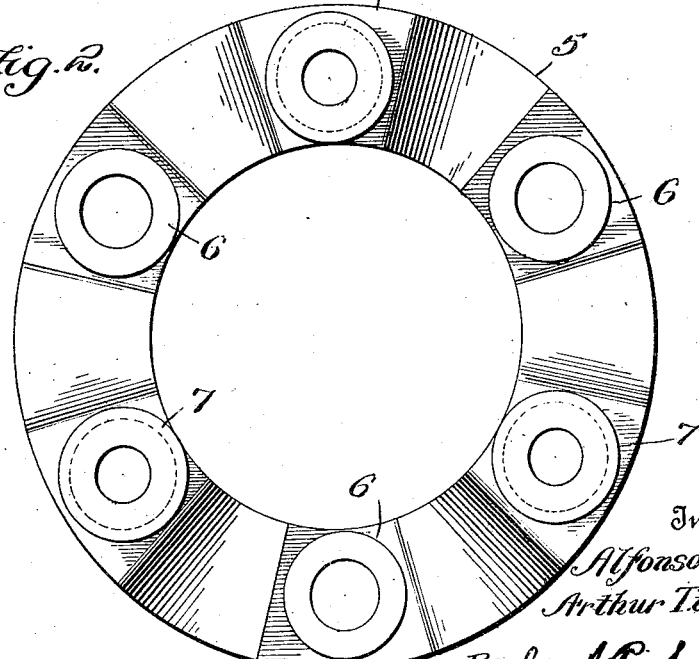
Fig. 2 is a plan of the spider member of the unit.

The improved unit, as here shown, comprises a brake drum 1, having its flange member 2, keyed or otherwise secured to the driven shaft section 3, by means of a hub or central sleeve 4. The brake drum proper thus encircles and is connected directly to the driven shaft, and hence the brake application is a direct one, and thus more effective.

A spider 5 is arranged between the flange 2 of the brake drum and the universal joint 5, such spider having three equally spaced bearing points 6 offset toward the drum flange, and three similar alternate and equally spaced bearing points 6 offset from the flange of the brake drum.

The points 6 of the spider are connected directly to the flange of the brake drum, as by bolts 8, the flange being preferably thickened at appropriate points for the purpose. The bearing points 7 of the spider are formed for reception of the connecting bolts 9 of the universal joint. Thus the spider is connected to the brake drum, and forms a part of the universal joint, the brake drum forming the sole support for the spider.

The parts of the unit forming the subject matter of this invention may, as is obvious, be readily assembled or disconnected, and that when in use they form a rigid and substantial connection, while at the same time arranging the brake drum in the most effective relation to the driven shaft.

Having thus described the invention, what is claimed, is:—

1. In a motor vehicle drive, a drive shaft, a driven shaft, a brake drum mounted on the driven shaft, a universal joint, and a spider having alternate points of connection with the brake drum and universal joint.

2. In a motor vehicle drive, a drive shaft, a driven shaft, a brake drum mounted on the driven shaft, a universal joint, and a spider connecting the brake drum and universal joint in spaced substantially aligned positions.

In testimony whereof we affix our signatures.

ALFONSO M. LEONI,
ARTHUR TISCHER.